(12) United States Patent
Zuver et al.

(10) Patent No.: US 11,319,847 B2
(45) Date of Patent: May 3, 2022

(54) EXHAUST DEVICE WITH NOISE SUPPRESSION SYSTEM

(71) Applicant: Tenneco Automotive Operating Company Inc., Lake Forest, IL (US)

(72) Inventors: Garrick R. Zuver, Brooklyn, MI (US); Lawrence J. Noren, IV, Springport, MI (US); Charles L. Bell, Brooklyn, MI (US)

(73) Assignee: TENNECO AUTOMOTIVE OPERATING COMPANY INC., Lake Forest, IL (US)

( * ) Notice: Subject to any disclaimer, the term of this patent is extended or adjusted under 35 U.S.C. 154(b) by 764 days.

(21) Appl. No.: 16/135,140

(22) Filed: Sep. 19, 2018

(65) Prior Publication Data

US 2020/0088078 A1   Mar. 19, 2020

(51) Int. Cl.
*F01N 1/02* (2006.01)
*F01N 13/08* (2010.01)

(52) U.S. Cl.
CPC .............. *F01N 1/023* (2013.01); *F01N 1/026* (2013.01); *F01N 13/08* (2013.01); *F01N 2470/18* (2013.01); *F01N 2470/24* (2013.01)

(58) Field of Classification Search
CPC .......... F01N 1/023; F01N 1/026; F01N 13/08; F01N 13/1811; F01N 13/1816; F01N 2470/24
See application file for complete search history.

(56) References Cited

U.S. PATENT DOCUMENTS

| 3,656,784 | A | * | 4/1972 | Dow | ...................... F16L 17/02 |
| | | | | | 285/187 |
| 3,794,138 | A | | 2/1974 | Heath et al. | |
| 4,410,013 | A | | 10/1983 | Sasaki et al. | |
| 5,606,857 | A | * | 3/1997 | Harada | ................... F01N 13/08 |
| | | | | | 60/322 |

(Continued)

FOREIGN PATENT DOCUMENTS

| DE | 3238330 A1 | 4/1984 |
| EP | 0422356 A1 | 4/1991 |

(Continued)

OTHER PUBLICATIONS

First Examination Report for Indian Application No. 201924037654 dated Mar. 31, 2021 (with English translation).

*Primary Examiner* — Jeremy A Luks

(57) ABSTRACT

An exhaust device includes a housing, first and second pipes, and a spacer. The first and second pipes are at least partially disposed within the housing. The first and second pipes include respective first and second surfaces. A portion of the second pipe is disposed inside the first pipe. The first and second surfaces cooperate to define an annular volume into which the spacer is disposed to prevent direct communication between the first and second pipes. One of the first and second pipes is fluidly connected to an exhaust gas inlet. The other of the first and second pipes is fluidly connected to an exhaust gas outlet. One of the first and second surfaces defines a radial indentation. The other of the first and second surfaces defines a radial protrusion. The spacer is disposed at least partially within the radial indentation and is in direct communication with the radial protrusion.

16 Claims, 6 Drawing Sheets

(56) References Cited

U.S. PATENT DOCUMENTS

| | | | |
|---|---|---|---|
| 5,697,215 A * | 12/1997 | Canevet | F01N 13/08 60/272 |
| 5,729,972 A * | 3/1998 | Hayashi | F01N 3/28 60/299 |
| 5,799,395 A | 9/1998 | Nording et al. | |
| 5,832,723 A * | 11/1998 | Iwata | F01N 13/008 60/276 |
| 5,907,134 A * | 5/1999 | Nording | F16L 51/00 181/228 |
| 6,397,586 B1 | 6/2002 | Sakurai et al. | |
| 6,625,979 B2 * | 9/2003 | Sugaya | F01N 13/14 60/322 |
| 6,913,112 B2 | 7/2005 | Bogard | |
| 7,451,785 B2 * | 11/2008 | Taira | F16L 27/111 138/118 |
| 9,593,607 B2 | 3/2017 | Das et al. | |
| 9,650,931 B2 * | 5/2017 | Kast | B23K 31/02 |
| 2003/0006301 A1 | 1/2003 | Sugaya et al. | |
| 2006/0054381 A1 | 3/2006 | Takemoto et al. | |
| 2007/0107981 A1 * | 5/2007 | Sicotte | F01N 1/165 181/237 |
| 2009/0026763 A1 * | 1/2009 | Kircanski | F01N 13/1827 285/375 |
| 2009/0078498 A1 * | 3/2009 | Woods | F01N 1/10 181/252 |
| 2010/0193282 A1 | 8/2010 | Kim et al. | |
| 2015/0337699 A1 | 11/2015 | Kainuma et al. | |
| 2018/0142588 A1 | 5/2018 | Qi et al. | |

FOREIGN PATENT DOCUMENTS

| | | |
|---|---|---|
| EP | 0537603 A1 | 4/1993 |
| EP | 1388651 A2 | 2/2004 |
| JP | S6093112 A | 5/1985 |
| JP | 2002317630 A | 10/2002 |
| JP | 3433097 B2 | 8/2003 |
| JP | 2008031921 A | 2/2008 |
| JP | 4673789 B2 | 4/2011 |
| JP | 2012057612 A * | 3/2012 ............ G01M 3/283 |

* cited by examiner

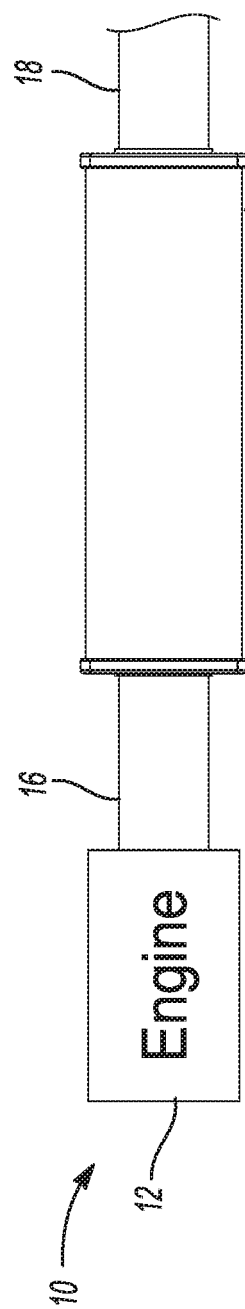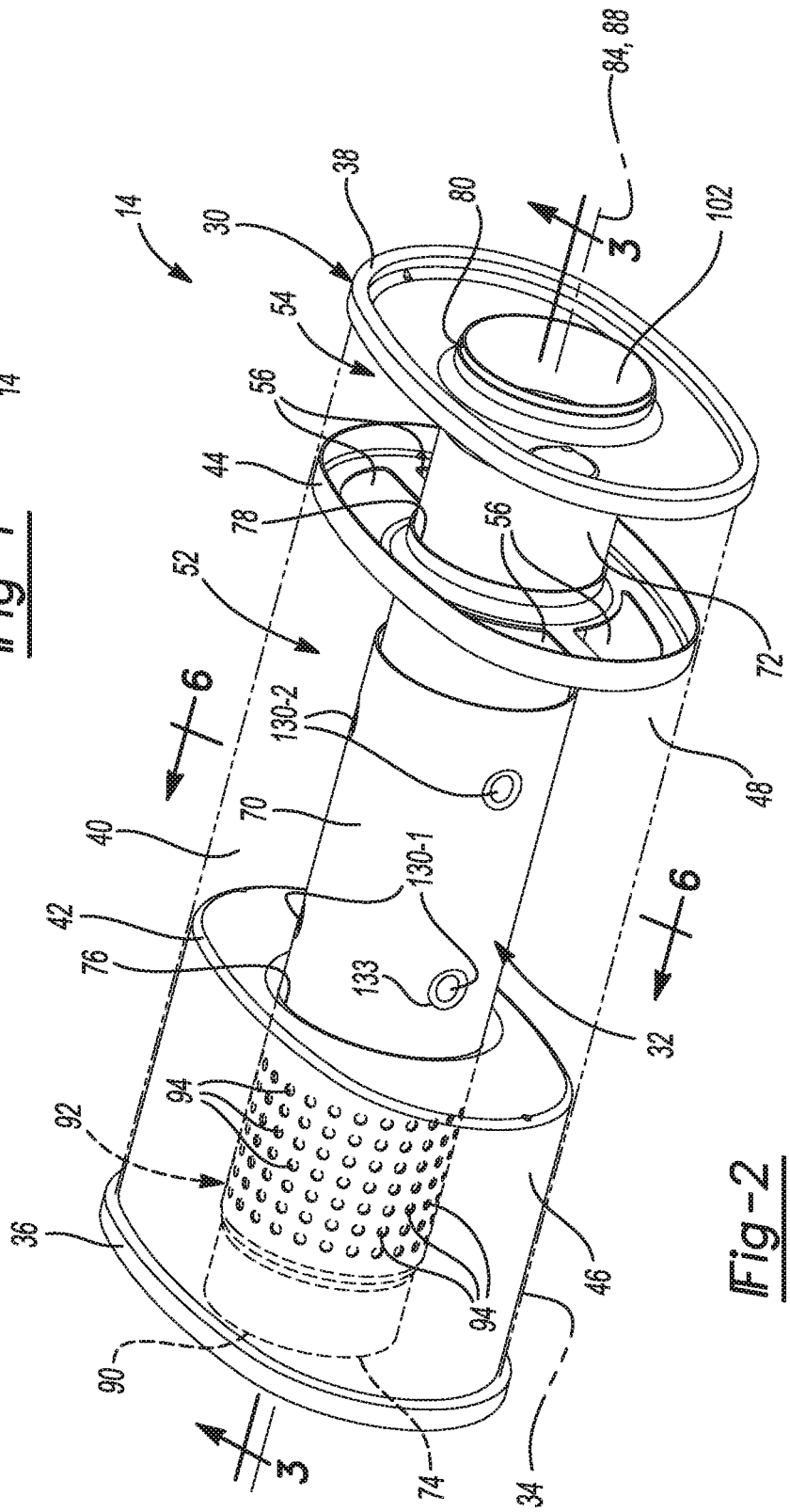

EXHAUST DEVICE WITH NOISE SUPPRESSION SYSTEM

FIELD

The present disclosure relates to an exhaust device with a noise suppression system.

BACKGROUND

This section provides background information related to the present disclosure which is not necessarily prior art.

An exhaust system for receiving exhaust gas from an internal combustion engine can include gasoline particulate filters (GPF), diesel particulate filters (DPF), diesel oxidation catalysts (DOC), lean NOx traps (LNT), selective catalytic reduction devices (SCR), and/or acoustic devices such as mufflers and resonators. Acoustic devices may include components such as a tube placed inside of another tube, or a tube having an end press-fitted over another tube. A temperature of one or both of the tubes may change during operation of the engine. The temperature may change, for example due to hot exhaust gas moving through one or both of the tubes. When the temperature of one or both of the tubes increases, the tube(s) thermally expand in radial and lengthwise directions and the assembled tubes build up a mechanical force based on the friction between the tubes. If the mechanical force exceeds the frictional force, the tubes can slip or slide past one another an abrupt manner. When the temperature decreases, the tubes contract. Relative motion between the tubes can generate undesirable noises, such as a "tick," a "ping," or a "pop."

SUMMARY

This section provides a general summary of the disclosure, and is not a comprehensive disclosure of its full scope or all of its features.

In various aspects, the present disclosure provides an exhaust device for receiving exhaust gas from a combustion engine. The exhaust device includes a housing, a first pipe, a second pipe, and at least one spacer. The first pipe is at least partially disposed within the housing. The first pipe extends along a longitudinal axis. The first pipe includes a first surface. The second pipe is at least partially disposed within the housing. The second pipe extends along the longitudinal axis and includes a second surface. At least a portion of the second pipe is disposed inside of the first pipe. The first surface and the second surface cooperate to at least partially define an annular volume between the first pipe and the second pipe. The annular volume is configured to receive a portion of the exhaust gas. The at least one spacer is at least partially disposed within the annular volume. The at least one spacer is configured to prevent direct communication between the first pipe and the second pipe. One of the first pipe and the second pipe is fluidly connected to an exhaust gas inlet. The other of the first pipe and the second pipe is fluidly connected to an exhaust gas outlet. One of the first surface and the second surface defines at least one radial indentation. The other of the first surface and the second surface defines at least one radial protrusion. The at least one spacer is disposed at least partially within the radial indentation. The at least one spacer is configured to be in direct communication with the radial protrusion.

In various aspects, the present disclosure provides another exhaust device for receiving exhaust gas from a combustion engine. The exhaust device includes a housing, a first pipe, a second pipe, a plurality of caps, and a plurality of spacers. The first pipe is at least partially disposed within the housing. The first pipe extends along a longitudinal axis. The first pipe includes a plurality of apertures. The second pipe is at least partially disposed within the housing. The second pipe extends along the longitudinal axis. The second pipe includes a plurality of radial protrusions. At least a portion of the second pipe is disposed inside of the first pipe. The first pipe and the second pipe cooperate to at least partially define an annular volume between the first pipe and the second pipe. The plurality of caps is coupled to the first pipe. Each cap of the plurality of caps sealingly encloses a respective aperture of the plurality of apertures. Each spacer of the plurality of spacers is in direct communication with a respective cap of the plurality of caps and a respective radial protrusion of the plurality of radial protrusions. One of the first pipe and the second pipe is fluidly connected to an exhaust gas inlet. The other of the first pipe and the second pipe is fluidly connected to an exhaust gas outlet.

In various aspects, the present disclosure provides yet another exhaust device for receiving exhaust gas from a combustion engine. The exhaust device includes a housing, a first pipe, a second pipe, and a plurality of caps. The first pipe is at least partially disposed within the housing. The first pipe extends along a longitudinal axis. The first pipe includes a plurality of apertures. The second pipe is at least partially disposed within the housing. The second pipe extends along the longitudinal axis. The second pipe includes a plurality of radial protrusions. At least a portion of the second pipe is disposed inside of the first pipe. The first pipe and the second pipe cooperate to at least partially define an annular volume between the first pipe and the second pipe. The plurality of caps is coupled to the first pipe. Each cap of the plurality of caps encloses and extends at least partially into a respective aperture of the plurality of apertures. Each cap is in direct communication with a respective radial protrusion of the plurality of radial protrusions. One of the first pipe and the second pipe is fluidly connected to an exhaust gas inlet. The other of the first pipe and the second pipe is fluidly connected to an exhaust gas outlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view of an exhaust system according to the principles of the present disclosure;

FIG. 2 is a perspective view of an exhaust device of the exhaust system of FIG. 1;

Corresponding reference numerals indicate corresponding parts throughout the several views of the drawings.

DETAILED DESCRIPTION

Figure 3:
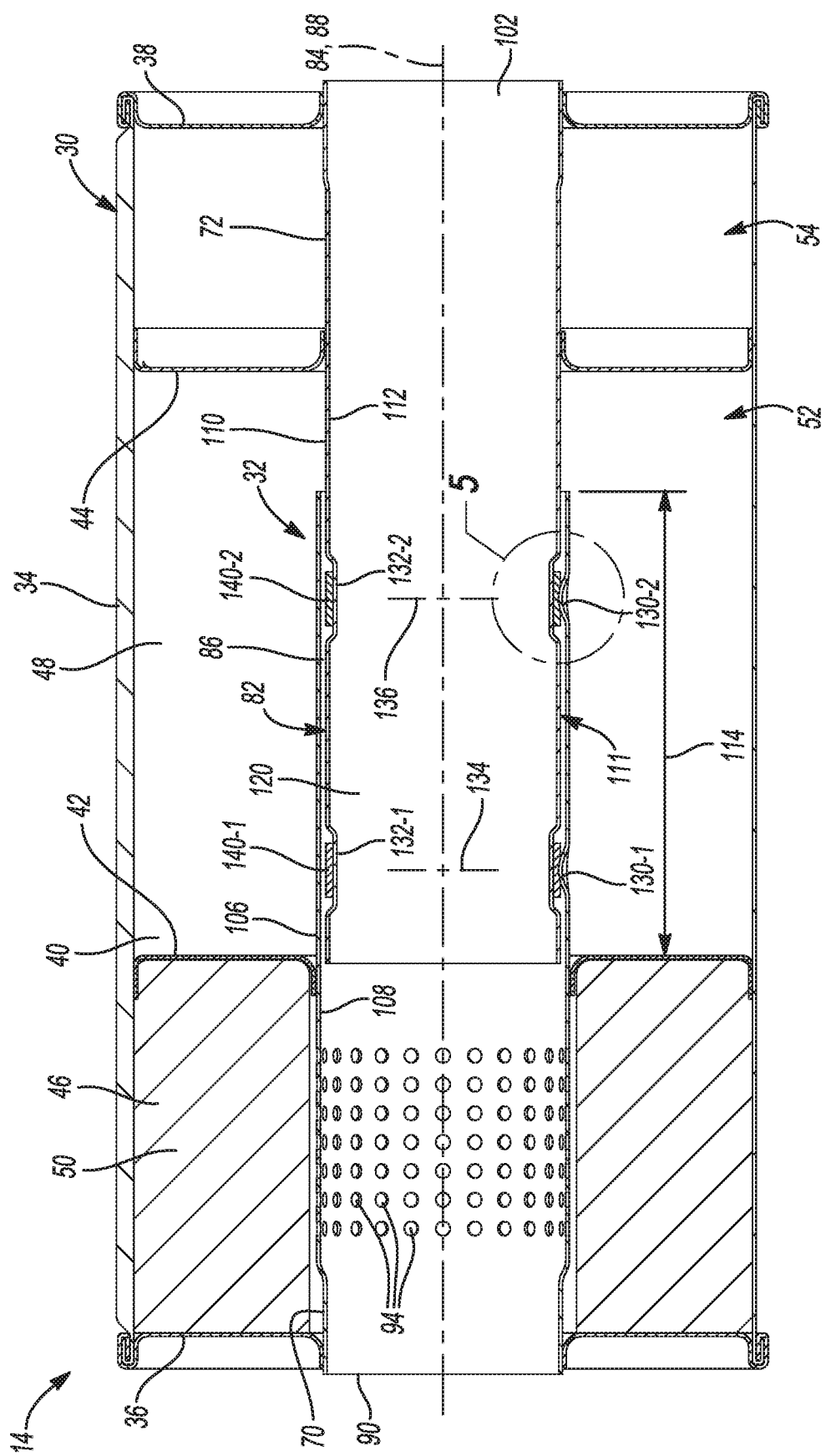
FIG. 3 is a sectional view of the exhaust device of FIG. 2 taken at line 3-3 of FIG. 2.
Figure 4:
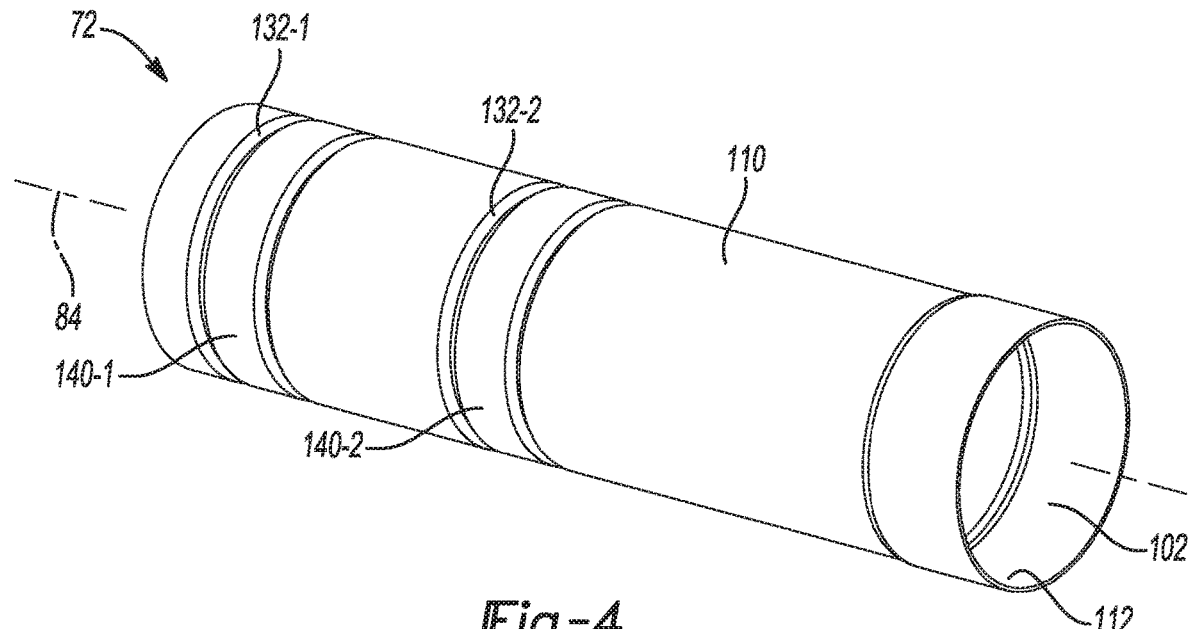
FIG. 4 is a perspective view of an inner pipe and a plurality of spacers of the exhaust device of FIG. 2.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exhaust system 10 according to the principles of the present disclosure is provided. The exhaust system 10 may include an internal combustion engine 12 (shown schematically) and an exhaust device 14. The exhaust device 14 may receive exhaust gas from an exhaust inlet pipe 16 that is fluidly connected to the engine 12. The exhaust device 14 may discharge exhaust gas through an exhaust outlet pipe 18. The exhaust device 14 may be an acoustic attenuation assembly, such as, a muffler, a resonator, a tuning component, or a pinch can, by way of example. In various aspects, the exhaust device 14 may be the acoustic attenuation assembly. The exhaust system 10 may further include additional components, such as, one or more gasoline particulate filters (GPF), a diesel particulate filters (DPF), a diesel oxidation catalysts (DOC), a lean NOx traps (LNT), a selective catalytic reduction devices (SCR), additional acoustic devices (e.g., a muffler, a resonator, a tuning component, a pinch can), and valves (e.g., a hand valve, an E-valve) (not shown).

Referring now to FIGS. 2-6, the exhaust device 14 may generally include a housing assembly 30 and a Helmholtz assembly 32 that is disposed at least partially within the housing assembly 30. The housing assembly 30 may include a shell 34, a first end cap 36, and a second end cap 38. The first end cap 36 and the second end cap 38 may be hermetically sealed to the shell 34. For example the first and second end caps 36, 38 may be coupled to the shell 34 by fluid-tight lock seams. The shell 34, the first end cap 36, and the second end cap 38 may cooperate to at least partially define an interior compartment 40 into which the Helmholtz assembly 32 is disposed. The Helmholtz assembly 32 may be included in a variety of different housing geometries. For example, a housing may omit end caps, such as in a bottle resonator (not shown).

The exhaust device 14 may further include one or more baffles, such as a first baffle 42 and a second baffle 44. The first and second baffles 42, 44 may provide structural support for the Helmholtz assembly 32 within the interior compartment 40 of the housing assembly 30. The baffles 42, 44 may divide the interior compartment 40 into two or more chambers, such as a first chamber 46 and a second chamber 48.

The first end cap 36, the first baffle 44, and the shell 34 may cooperate to at least partially define the first chamber 46. As best shown in FIG. 3, the first chamber 46 may include a sound-attenuating material 50. The first baffle 44, the second end cap 38, and the shell 34 may cooperate to at least partially define the second chamber 48. The second baffle 44 may be disposed within the second chamber 48. The second baffle 44 may divide the second chamber 48 into a first portion 52 and a second portion 54. The first and second portions 52, 54 of the second chamber 48 may fluidly communicate through a plurality of baffle openings 56 (FIG. 2) defined in the second baffle 44.

The first and second end caps 36, 38 and the first and second baffles 42, 44 may cooperate to support the Helmholtz assembly 32 within the housing assembly 30. The Helmholtz assembly 32 may include a first or outer pipe 70 and a second or inner pipe 72. The first pipe 70 may extend through a first opening 74 of the first end cap 36 and a second opening 76 of the first baffle 44. The second pipe 72 may extend through a third opening 78 in the second baffle 44 and a fourth opening 80 in the second end cap 38.

As best shown in FIG. 3, a portion 82 of the second pipe 72 may be disposed inside of the first pipe 70. The first pipe 70 and the second pipe 72 may extend along a common longitudinal axis 84 such that they are concentrically disposed. The first pipe 70 and the second pipe 72 may cooperate to at least partially define an annular volume 86 between the first pipe 70 and the second pipe 72. Although the first and second pipes 70, 72 are shown as extending coaxial to a longitudinal axis 88 of the shell 34, in various alternative aspects, the longitudinal axis 84 of the first and second pipes 70, 72 may be offset from the longitudinal axis 88 of the shell 34 (not shown).

The first pipe 70 may be fluidly connected to an inlet opening 90 (also referred to as an "exhaust gas inlet"). For example, the inlet opening 90 may be formed in the first pipe 70, as shown. The inlet opening 90 may receive exhaust gas from the exhaust inlet pipe 16 (FIG. 1). The first end cap 36, the first pipe 70, and the exhaust inlet pipe 16 may be fluidly sealed to one another, for example, by a weld. A portion 92 the first pipe 70 may include a plurality of perforations 94. The portion 92 of the first pipe 70 may be disposed within the first chamber 46 of the housing assembly 30.

The second pipe 72 may be fluidly connected to an outlet opening 102 (also referred to as an "exhaust gas outlet"). For example the outlet opening 102 may be formed in the second pipe 72, as shown. The outlet opening 102 may discharge exhaust gas from the Helmholtz assembly 32 to the exhaust outlet pipe 18 (FIG. 1). The first end cap 36, the second pipe 72, and the exhaust outlet pipe 18 may be fluidly sealed to one another, for example by a weld.

The configuration described above, in which the first pipe 70 includes the inlet opening 90 and the second pipe 72 includes the outlet opening 102, forms an active tuner. However, in various alternative embodiments, the first and second pipes 70, 72 may be configured to form a passive tuner (not shown). In the passive tuner, the second pipe 72 includes an inlet opening and the first pipe 70 includes an outlet opening. Accordingly, one of the first pipe 70 and the second pipe 72 includes the inlet opening 90 and the other of the first pipe 70 and the second pipe 72 includes the outlet opening 102.

Returning to FIGS. 2-6, the first pipe 70 may include a first outer surface 106 and a first inner surface 108. The second pipe 72 may include a second outer surface 110 and a second inner surface 112. The annular volume 86 may be at least partially defined by the first inner surface 108 of the first pipe 70 and the second outer surface 110 of the second pipe 72. The annular volume 86 may form a concentric Helmholtz tuner or neck 111. A geometry of the annular volume 86, including a length 114 and annular cross-sectional area may be optimized to achieve the desired acoustic tuning. The first pipe 70 and the second pipe 72 may be free of perforations or openings within the Helmholtz neck 111.

During operation of the engine 12, the first pipe 70 may receive exhaust gas from the inlet opening 90. A portion of the exhaust gas may flow through plurality of perforations 94 into the first chamber 46. The remainder of the exhaust gas may continue to flow through the first pipe 70. Another portion of the exhaust gas may flow into the annular volume 86 of the Helmholtz neck 111 and into the second chamber 48. The other portion of the exhaust gas may flow into a central volume 120 of the second pipe 72. The exhaust gas may be discharged from the second pipe 72 through the outlet opening 102.

Figure 5:
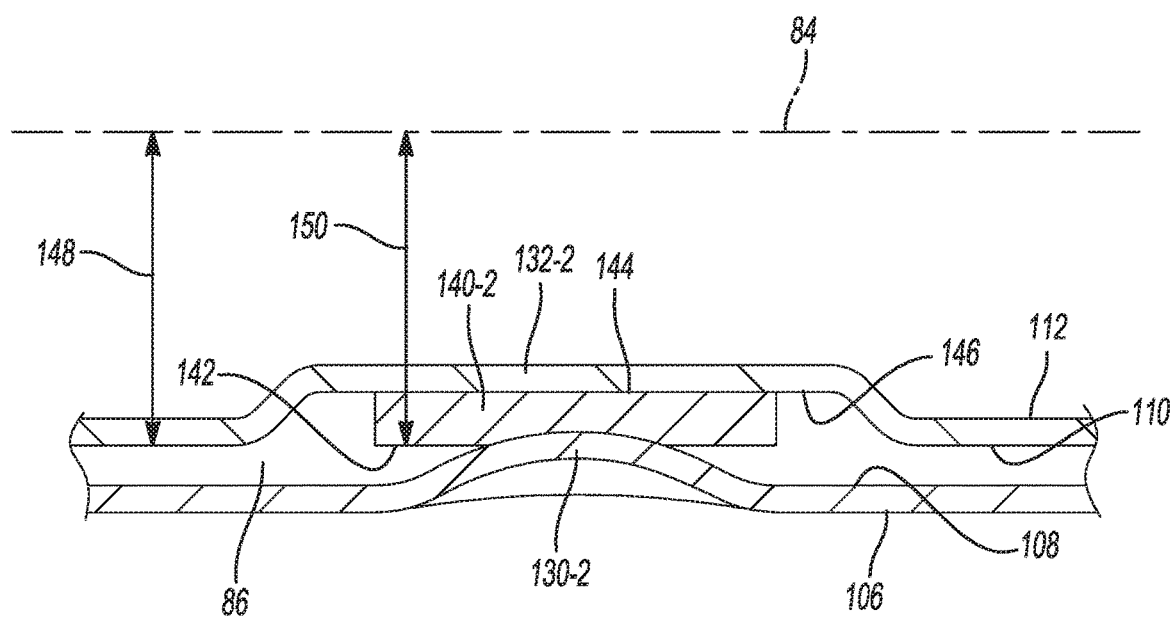
FIG. 5 is a partial sectional view of a Helmholtz assembly of the exhaust device of FIG. 3.
Figure 6:
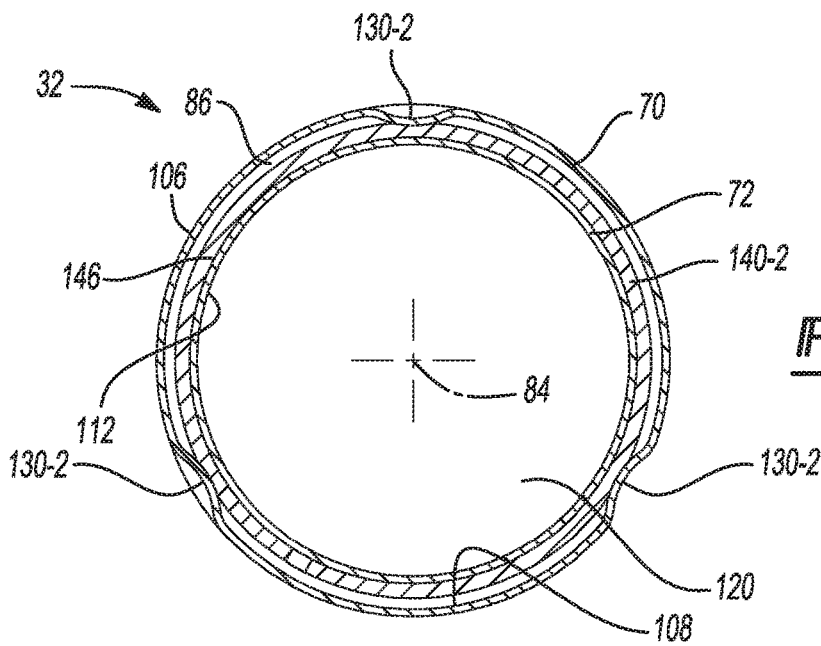
FIG. 6 is a sectional view of the Helmholtz assembly of the exhaust device FIG. 2, taken at line 6-6 of FIG. 2.

One of the first pipe 70 and the second pipe 72 includes a radial protrusion, and the other of the first pipe 70 and the second pipe 72 includes a radial indentation. The radial protrusion and the radial indentation may be disposed at a common axial location (i.e., along the longitudinal axis 84 of the first and second pipes 70, 72). For example, as best shown in FIGS. 3 and 5, the first pipe 70 may include one or more radially-inward protrusions 130. The second pipe 72 may include one or more radially-inward indentations 132.

The radial protrusions 130 may extend from the first inner surface 108 of the first pipe 70 into the annular volume 86. The radially protrusions 130 may be circumferentially-spaced apart (i.e., disposed about a circumference of the first pipe 70) and disposed at a common axial location. Although the protrusions 130 are shown as being integrally formed with a wall the first pipe 70, in various alternative aspects, the protrusions 130 may be distinct components that are coupled to the first pipe 70 (not shown). For example, the protrusions 130 may be welded on to the first inner surface 108 of the first pipe 70. As best shown in FIG. 2, each protrusion 130 may have a substantially circular perimeter 133.

The one or more radial protrusions 130 may include a first plurality of radial protrusions 130-1 and a second plurality of radial protrusions 130-2. The first plurality of radial protrusions 130-1 may be disposed at a first axial location 134 (i.e., along the longitudinal axis 84) and the second plurality of radial protrusions 130-2 may be disposed at a second axial location 136. The second axial location 136 may be disposed downstream of the first axial location 134.

The first plurality of radial protrusions 130-1 may include three radial protrusions, by way of example. The second plurality of radial protrusions 130-2 may include three radial protrusions, by way of example. The radial protrusions of the first plurality 130-1 may be circumferentially spaced about the longitudinal axis 84. The first plurality of radial protrusions 130-1 may be substantially equally spaced about the longitudinal axis 84. The radial protrusions of the second plurality 130-2 may be circumferentially spaced about the longitudinal axis 84. The second plurality of radial protrusions 130-2 may be substantially equally spaced about the longitudinal axis 84. In various alternative aspects, the first and second pluralities of radial protrusions may include different quantities of radial protrusions.

The second pipe 72 may include the radial indentations 132. The radial indentations 132 may extend away from the annular volume 86. The radial indentations 132 may be ring-shaped such that each indentation 132 extends 360° about the longitudinal axis 84. In various aspects, the indentations 132 may be referred to as annular indentations. Although the indentations 132 are shown as being integrally formed with a wall of the second pipe 72, in various alternative aspects, the indentations 132 may be machined into the second outer surface 110 (not shown).

The second pipe 72 may have the same diameter on either side of the indentation 132. However, in various alternative aspects, a second pipe may have different diameters on opposing sides of an indentation. In one example, a second pipe has a first diameter upstream of an indentation and within the indentation, and a second diameter downstream of the indentation, the second diameter being larger than the first diameter (not shown).

The at least one radial indentation 132 may include a first radial indentation 132-1 and a second radial indentation 132-2. The first radial indentation 132-1 may be disposed at the first axial location 134. The second radial indentation 132-2 may be disposed at the second axial location 136. In various aspects, the first radial indentation 132-1 is referred to as a first annular indentation and the second radial indentation 132-2 is referred to as a second annular indentation.

The exhaust device 14 may further include one or more spacers 140. The spacers 140 may be concentrically disposed between the first pipe 70 and the second pipe 72. The spacers 140 may be in direct communication (i.e., physical contact) with the first pipe 70 and the second pipe 72. The spacers 140 may reduce or eliminate direct contact between the first pipe 70 and the second pipe 72 during radial thermal expansion of the pipes 70, 72. Due to the relatively small contact areas between the spacers 140 in the first and second pipes 70, 72, frictional force is minimized during axial thermal expansion. Therefore, at least one of the first pipe 70 and the second pipe 72 is adapted to expand in an axial direction (i.e., a direction substantially parallel to the longitudinal axis 84) with respect to the other of the first pipe 70 in the second pipe 72.

In various aspects, each spacer 140 of the plurality may define a plurality of pores (not shown) through which exhaust gas can flow. For example, the spacers 140 may be formed from or include wire mesh or a similar material. The spacers 140 may be ring shaped and may extend 360° about the longitudinal axis 84. In various aspects, the spacers 140 may be referred to as annular spacers.

The at least one spacer 140 may include a first annular spacer 140-1 and a second annular spacer 140-2. The first annular spacer 140-1 may be disposed at the first axial location 134. The first annular spacer 140-1 may be disposed at least partially within the first annular indentation 132-1. The first annular spacer 140-1 may be in direct communication with the first plurality of radial protrusions 130-1. The second annular spacer 140-2 may be disposed at the second axial location 136. The second annular spacer 140-2 may be at least partially disposed with in the second annular indentation 132-2. The second annular spacer 140-2 may be in direct communication with the second plurality of radial protrusions 130-2.

Each spacer 140 may be coupled to the second pipe 72. For example each spacer 140 may be welded to the second outer surface 110 of the second pipe 72. In various alternative aspects, each spacer 140 may at least partially encircle the second pipe 72 to form the ring and be retained within the respective annular indentation 132.

With reference to FIG. 5, each spacer 140 may include an outer surface 142 and an inner surface 144. Each indentation 132 of the second pipe 72 may include an indentation surface 146. The inner surface 144 of the spacer 140 may be in direct communication with indentation surface 146 of the second pipe 72. The outer surface 142 of the spacer 140 may be in direct communication with the radial protrusions 130 of the first pipe 70. The second outer surface 110 may be a first distance 148 from the longitudinal axis 84. The outer surface 142 of the spacer 140 may be a second distance 150 from longitudinal axis 84. The second distance 150 may be less than the first distance 148. Therefore, each spacer 140 may be disposed sub-flush to the second outer surface 110 of the second pipe 72 so that the entire spacer 140 is disposed completely within the indentation 132. Accordingly, the spacers 140 do not significantly inhibit flow of the exhaust gas to the annular volume 86. In various alternative aspects, the first and second distances 148, 150 may be substantially equal, or the second distance 150 may be greater than the first distance 148 (not shown). These alternative configurations can be used, for example, when the spacers 140 are highly porous and would not inhibit the flow of exhaust gas through the annular volume 86.

Although the Helmholtz assembly 32 is shown as having two spacers 140 (and corresponding radial protrusions and indentations 130, 132), other quantities spacers are contemplated. For example, a Helmholtz assembly may include a single spacer disposed at least partially within a single indentation and in direct communication with a single protrusion or plurality of protrusions (not shown). In other examples, a Helmholtz assembly may include greater than two spacers, such as three spacers, four spacers, or five spacers, by way of example (not shown).

In alternative embodiments (not shown), a Helmholtz assembly can include a first or outer pipe having a radially-outward indentation, a second or inner pipe having a radially-outward protrusion, and a spacer disposed in the indentation of the first pipe. The spacer may be in direct communication with the protrusion of the second pipe. The spacer may be disposed sub-flush to an inner surface of the first pipe.

Figure 7:
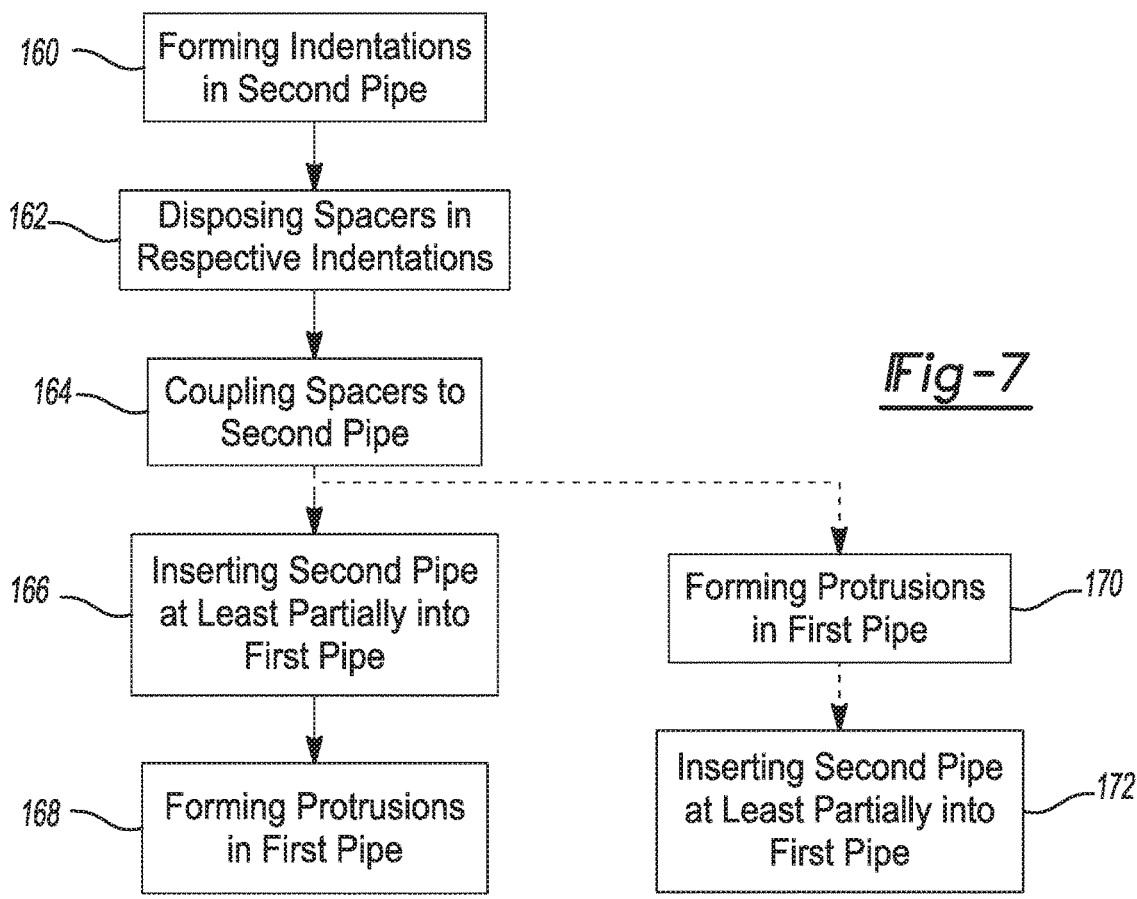
FIG. 7 is a flow chart depicting a method of assembling the exhaust device of FIG. 2 according to the principles of the present disclosure.

Referring to FIG. 7, a method of assembling the Helmholtz assembly 32 according to the principles of the present disclosure is provided. At 160, the method may include forming the indentations 132 in the second pipe 72. At 162, the method may include disposing the spacers 140 at least partially within respective indentations 132 of the second pipe 72. At 164, the method may include coupling each spacer 140 the second pipe 72. Coupling the spacers 140 to the second pipe 72 can include directly coupling the spacer 140 to the second outer surface 110 of the second pipe 72, such as by welding, or forming the spacer 140 into a ring or a portion of a ring that is retained within the indentation 132, for example. At 166, the method may include inserting a portion of the second pipe 72 into the first pipe 70 so that the pipes 70, 72 are aligned along the common longitudinal axis 84 to be concentrically disposed. At 168, the method may include forming the protrusions 130 in the first pipe 70 so that protrusions 130 engage the spacers 140.

In various alternative aspects, a method of assembly the Helmholtz assembly 32 can include forming both the indentations 132 in the second pipe 72 and the protrusions 130 in the first pipe 70 prior to inserting the second pipe 72 at least partially into the first pipe 70. The method may include steps 160, 162, and 164 as described above. At 170, the method may further include forming the protrusions 130 in the first pipe 70. At 172, the method may include inserting the second pipe 72 at least partially into the first pipe 70 so that the pipes 70, 72 are aligned along the common longitudinal axis 84 and the protrusions 130 engage the spacers 140. The protrusions 130 may be formed in the first pipe 70 at any time prior to inserting the second pipe 72 at least partially into the first pipe 70.

Figure 8:
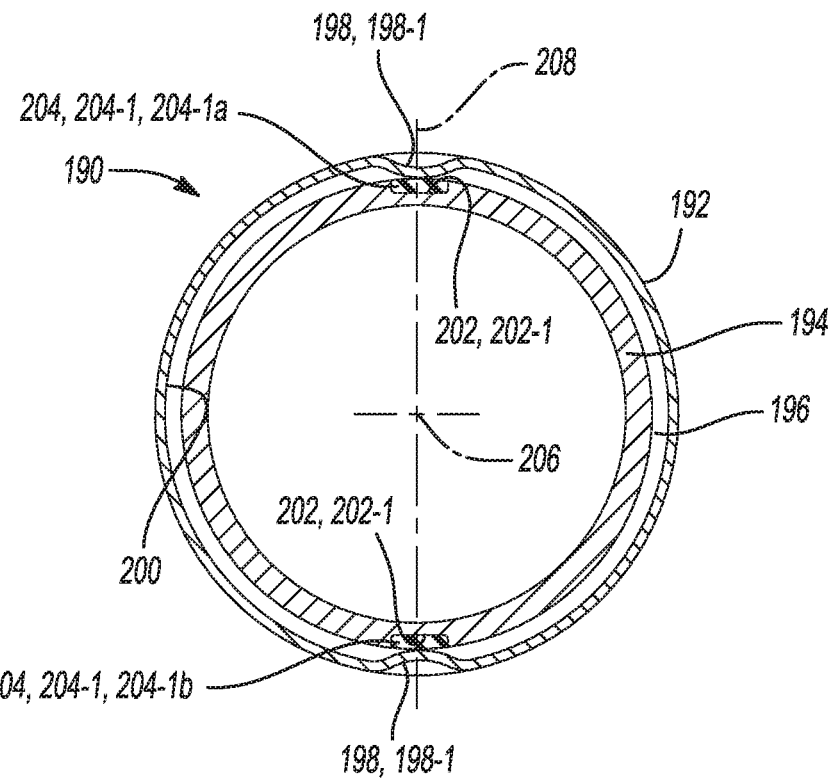
FIG. 8 is a sectional view of another exhaust device according to the principles of the present disclosure, taken at a first axial location.
Figure 9:
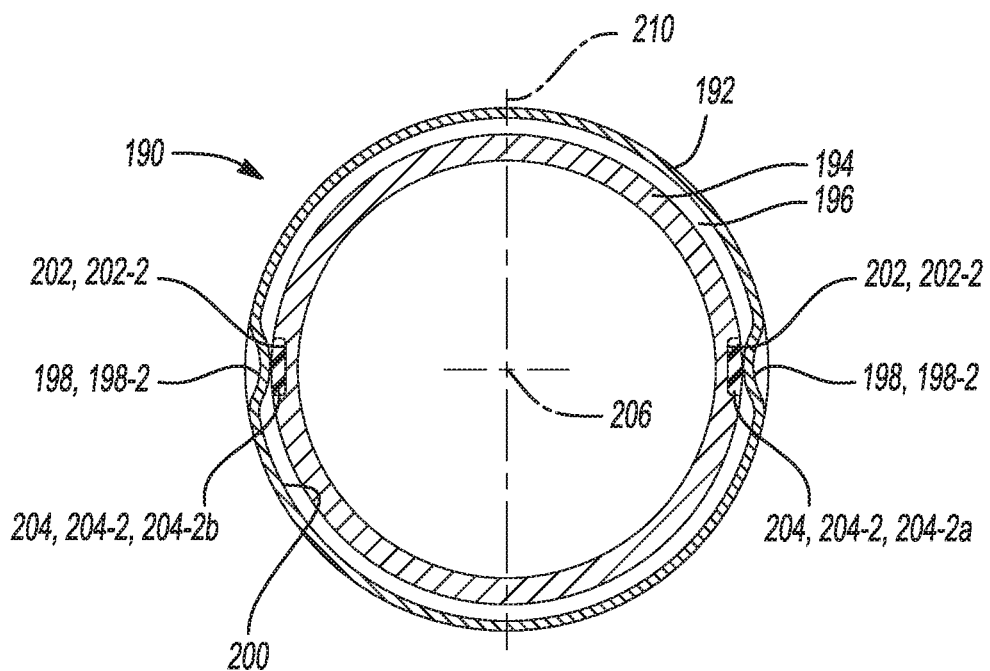
FIG. 9 is a sectional view of the exhaust device of FIG. 8, taken at a second axial location.

The present disclosure contemplates other configurations for concentric Helmholtz tuners that include radial protrusions, radial indentations, and spacers. With reference to FIGS. 8-9, another Helmholtz assembly 190 according to the principles of the present disclosure is provided. The Helmholtz assembly 190 may include a plurality of discrete spacer pads rather than ring-shaped spacers (see e.g., spacers 140 of the Helmholtz assembly 32 of FIGS. 2-6). Unless otherwise described below, the Helmholtz assembly 190 may be similar to the Helmholtz assembly 32 of FIGS. 2-6.

The Helmholtz assembly 190 includes a first or outer pipe 192 and a second or inner pipe 194. At least a portion of the second pipe 194 is disposed inside the first pipe 192. The first pipe 192 and the second pipe 194 may cooperate to at least partially define an annular volume 196 between the first pipe 192 and the second pipe 194. Exhaust gas can flow through the annular volume 196.

The first pipe 192 includes a plurality of radial protrusions 198. The plurality of radial protrusions may include a first plurality of radial protrusions 198-1 disposed at a first axial location (see, e.g., the first axial location 134 of FIG. 3) and a second plurality of radial protrusions 198-2 disposed at a second axial location (see, e.g., the second axial location 136 of FIG. 3). The first plurality of radial protrusions 198-1 may include two radial protrusions. The second plurality of radial protrusions 198-2 may include two radial protrusion. The plurality of radial protrusions 198 may extend from an inner surface 200 of the first pipe 192 into the annular volume 196. The protrusions 198 may be similar to the protrusions 130 of the Helmholtz assembly 32 of FIGS. 2-6.

The second pipe 194 may include a plurality of radial indentations 202, such as a first plurality of radial indentations 202-1 disposed at the first axial location and a second plurality of radial indentations 202-2 disposed at the second axial location. The first plurality of radial indentations 202-1 may include two radial indentations. The second plurality of radial indentations 202-2 may include two radial indentations. The radial indentations 202 may define pluralities of discrete pockets rather than a singular annular indentation. The first plurality of radial indentations 202-1 may be circumferentially spaced. The second plurality of radial indentations 202-2 may be circumferentially spaced.

The Helmholtz assembly 190 may further include plurality spacers 204, such as a first plurality of spacers 204-1 disposed at the first axial location and a second plurality of spacers 204-2 disposed at the second axial location. The spacers 204 may be discrete spacer pads rather than single ring-shaped spacers. Each spacer 204 may be at least partially disposed within a respective radial indentation 202 of the second pipe 194. Each spacer 204 may be in direct communication with the respective radial protrusion 198 of the first pipe 192. The spacers 204 may be formed from or include wire mesh or a similar material. The spacers 204 may be similar to the spacers 140 of the Helmholtz assembly 32 of FIGS. 2-6.

FIG. 8 depicts the Helmholtz assembly 190 at the first axial location (similar to the first axial location 134 of the Helmholtz assembly 32 of FIGS. 2-6). FIG. 9 depicts the Helmholtz assembly 190 at the second axial location (similar to the second axial location 136 of the Helmholtz assembly 32 of FIGS. 2-6). As will be described in greater detail below, locations of the second plurality of radial protrusions 198-2, the second plurality of radial indentations 202-2, and the second plurality of spacers 204-2 may be angularly offset from the first plurality of radial protrusions 198-1, the first plurality of radial indentations 202-1, and the first plurality of spacers 204-1 about a longitudinal axis 206.

With reference to FIG. 8, the first plurality of spacers 204-1 includes a first spacer 204-1a and a second spacer 204-1b. The first spacer 204-1a is disposed at a first angular location with respect to a first transverse axis 208 that extends substantially perpendicular to the longitudinal axis 206. The second spacer 204-1b is disposed at a second angular location with respect to the first transverse axis 208. The first and second spacers 204-1a, 204-1b may be substantially equally spaced about the longitudinal axis 206. In one example, the first spacer 204-1a forms an angle of about 0° with respect to the first transverse axis 208. The second spacer 204-1b forms an angle of about 180° with respect to the first transverse axis 208.

Referring to FIG. 9, the second plurality of spacers 204-2 may include a third spacer 204-2a and a fourth spacer 204-2b. The third spacer 204-2a is disposed at a third angular location about the longitudinal axis 206. The fourth spacer 204-2b is disposed at fourth angular location about the longitudinal axis 206. The third angular location is different from first angular location and the second angular location. The fourth angular location is different from the first angular location and the second angular location. The third and fourth spacers 204-2a, 204-2b may be substantially equally spaced about the longitudinal axis 206. In one example the third spacer 204-2a forms an angle of about 90° with respect to a second transverse axis 210 that extends substantially perpendicular to the longitudinal axis 206. The fourth spacer 204-2b forms an angle of about 270° with respect to the second transverse axis 210. Although the spacers 204 are shown as offset from one another about the longitudinal axis 206 at the first and second axial locations, in alternative aspects, the first plurality of spacers 204-1 and the second plurality of spacers 204-2 may be angularly aligned (not shown).

Figure 10:
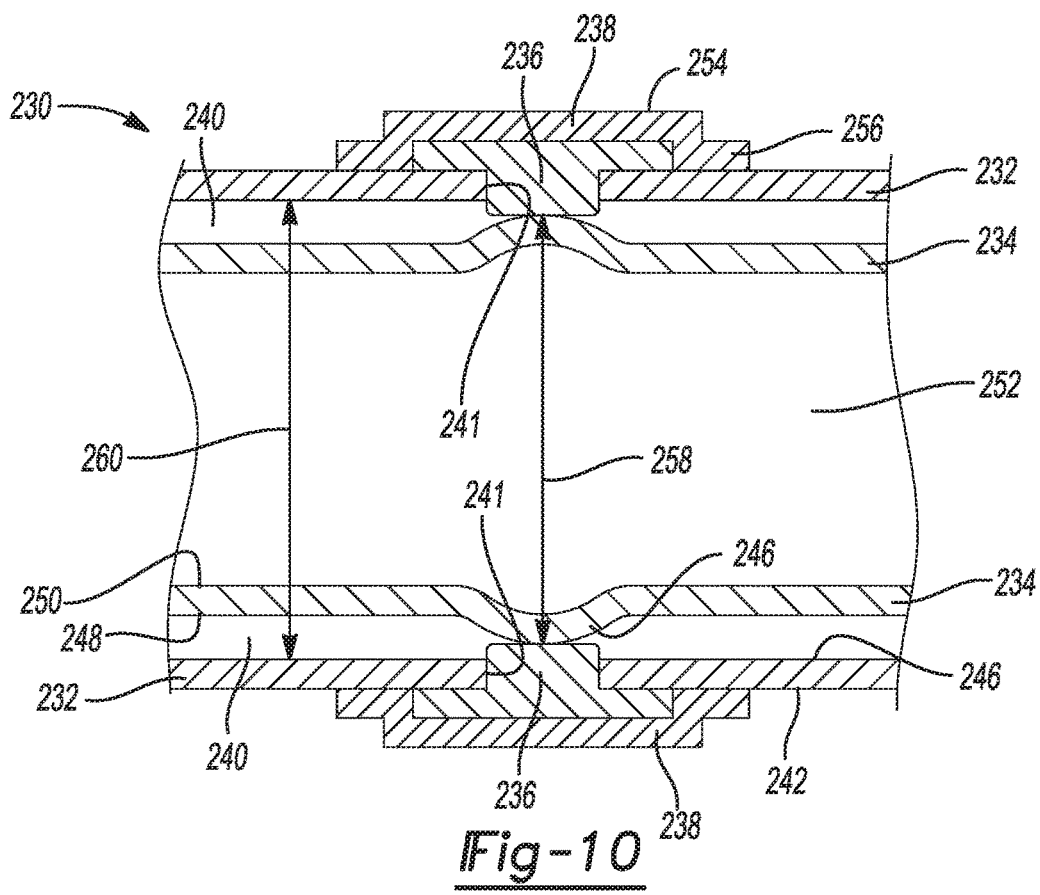
FIG. 10 is a sectional view of yet another Helmholtz assembly according to the principles of the present disclosure.

With reference to FIG. 10 yet another Helmholtz assembly 230 according to the principles of the present disclosure is provided. The Helmholtz assembly 230 generally includes a first or outer pipe 232 a second or inner pipe 234, a plurality of spacers 236, and a plurality of caps 238. A portion of the second pipe 234 is disposed within the first pipe 232. The first and second pipes 232, 234 cooperate to at least partially define an annular volume 240 through which exhaust gas can flow.

The first pipe 232 may include a plurality of apertures 241. Each aperture 241 may extend between a first outer surface 242 and a first inner surface 244 of the first pipe 232. The second pipe 234 may include a plurality of radial protrusions 246. Each radial protrusion 246 may extend from a second outer surface 248 of the second pipe 234 into the annular volume 240. A second inner surface 250 of the second pipe 234 may at least partially define a central volume 252 through which exhaust gas can flow.

Each spacer 236 may extend across a respective aperture 241. Each spacer 236 may be disposed one or more of: radially outside of the respective aperture 241 (i.e., on the first outer surface 242), inside of the respective aperture 241 (i.e., on the first inner surface 244, not shown), and at least partially within the respective aperture 241. For example, the spacers 236 of FIG. 10 are disposed both radially outside of and within the respective apertures 241. Each spacer 236 may be in direct communication with a respective protrusion 246 of the second pipe 234. The plurality of spacers 236 may be formed from or include wire mesh or a similar material.

Each cap 238 may sealingly enclose a respective aperture 241. Each cap 238 may include a body 254 and a flange 256. In some examples, the body 254 may be an annular body. The flange 256 may be in direct communication with first outer surface 242 of the first pipe 232. A fluid-tight seal may be formed between the flange 256 of the cap 238 and the first outer surface 242 of the first pipe 232. Each cap 238 may communicate with a respective spacer 236 to retain the spacers 236 within a respective aperture 241. Each cap 238 may therefore be in direct engagement with the respective spacer 236.

The spacers 236 may be discrete, circumferentially-spaced apart spacers, similar to those described above with respect to the Helmholtz assembly 190 of FIGS. 8-9. Therefore, the plurality of spacers 236 does not significantly inhibit the flow of exhaust gas through the annular volume 240. Furthermore, the spacers 236 may include a plurality of pores adapted to permit the flow of exhaust gas therethrough.

In various aspects, a maximum diameter 258 of the second pipe 234 may be less than a minimum diameter 260 of the first pipe 232. Accordingly, the plurality of radial protrusions 246 may be formed in the second pipe 234 prior to insertion of the second pipe 234 in the first pipe 232. Unless otherwise described, the Helmholtz assembly 230 of FIG. 10 may be similar to the Helmholtz assembly 190 of FIGS. 8-9.

Figure 11:
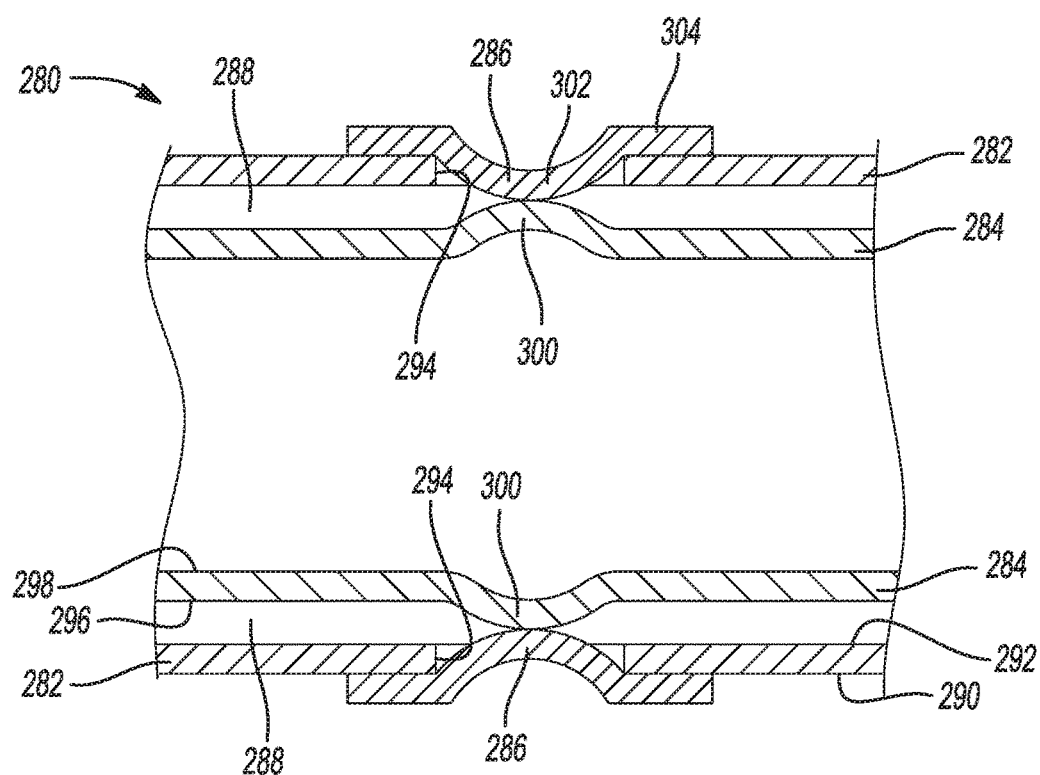
FIG. 11 is a sectional view of yet another Helmholtz assembly according to the principles of the present disclosure.

Referring to FIG. 11, yet another Helmholtz assembly 280 according to the principles of the present disclosure is provided. The Helmholtz assembly 280 may generally include a first or outer pipe 282, a second or inner pipe 284, and a plurality of caps 286. At least a portion of the second pipe 284 may be disposed inside of the first pipe 282. The first and second pipes 282, 284 may cooperate to at least partially define an annular volume 288 between the first pipe 282 and the second pipe 284.

The first pipe 282 may include a first outer surface 290 and a first inner surface 292. The first pipe 282 may include a plurality of apertures 294 extending between the first outer surface 290 and the first inner surface 292. The second pipe 284 may include a second outer surface 296 and the second inner surface 298. The second pipe 284 may include up plurality of radial protrusions 300 extending from the second outer surface 298 into the annular volume 288. The plurality of radial protrusions 300 may be substantially axially aligned with the plurality of apertures 294.

Each cap 286 may sealingly enclose a respective aperture 294 of the first pipe 282. Each cap 286 may include a body 302 and a flange 304. The body 302 may extend at least partially into a respective aperture 294 to engage a respective protrusion 300. The flange 304 may be in direct communication with the first pipe 282. A fluid seal may be formed between the flange 304 and the first outer surface 290 of the first pipe 282. The cap 286 may be formed from a lower-gauge material than the first and second pipes 282, 284. Accordingly, the cap 286 may be flexible enough to accommodate radial thermal expansion of the first and second pipes 282, 284. Unless otherwise described, the Helmholtz assembly 280 of FIG. 11 may be similar to the Helmholtz assembly 230 of FIG. 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust device for receiving exhaust gas from a combustion engine, the exhaust device comprising:
   a housing;
   a first pipe at least partially disposed within the housing, the first pipe extending along a longitudinal axis and including a first surface;
   a second pipe at least partially disposed within the housing, the second pipe extending along the longitudinal axis and including a second surface, at least a portion of the second pipe being disposed inside of the first pipe, the first surface and the second surface cooperating to at least partially define an annular volume between the first pipe and the second pipe, the annular volume being configured to receive a portion of the exhaust gas; and
   at least one spacer at least partially disposed within the annular volume and configured to prevent direct communication between the first pipe and the second pipe, wherein:
   one of the first pipe and the second pipe is fluidly connected to an exhaust gas inlet;
   the other of the first pipe and the second pipe is fluidly connected to an exhaust gas outlet;
   one of the first surface and the second surface defines at least one radial indentation;
   the other of the first surface and the second surface defines at least one radial protrusion; and
   the at least one spacer is disposed at least partially within the radial indentation and configured to be in direct communication with the radial protrusion, wherein the radial indentation is linearly-shaped in cross-section to allow relative longitudinal movement between the at least one spacer and the one of the first surface and the second surface.

2. The exhaust device of claim 1, wherein the at least one spacer is formed from or includes wire mesh.

3. The exhaust device of claim 1, wherein the at least one spacer includes a plurality of pores, the pores being adapted to permit a flow of exhaust gas therethrough.

4. The exhaust device of claim 1, wherein at least one of the first pipe and the second pipe is configured to expand in a direction substantially parallel to the longitudinal axis with respect to the other of the first pipe and the second pipe.

5. The exhaust device of claim 1, wherein the at least one spacer is fully disposed within the radial indentation.

6. The exhaust device of claim 1, wherein the radial protrusion extends from the first surface of the first pipe into the annular volume, and the second pipe includes the radial indentation.

7. The exhaust device of claim 1, wherein the at least one radial protrusion includes a plurality of circumferentially-spaced apart radial protrusions.

8. The exhaust device of claim 7, wherein the radial protrusions of the plurality of circumferentially-spaced apart radial protrusions are substantially equally spaced about the longitudinal axis.

9. The exhaust device of claim 8,
   the at least one radial indentation includes a first annular indentation; and
   the at least one spacer includes a first annular spacer, the first annular spacer being disposed concentrically between the first pipe and the second pipe and at least partially within the first annular indentation.

10. The exhaust device of claim 7, wherein the plurality of circumferentially-spaced apart radial protrusions includes three radially protrusions.

11. The exhaust device of claim 1, wherein:
the at least one radial indentation includes a first annular indentation; and
the at least one spacer includes a first annular spacer, the first annular spacer being disposed concentrically between the first pipe and the second pipe and at least partially within the first annular indentation.

12. The exhaust device of claim 11, wherein:
the first annular indentation and the first annular spacer are disposed at a first axial location;
the at least one radial indentation further includes a second annular indentation disposed at a second axial location;
the at least one spacer further includes a second annular spacer disposed at the second axial location, the second annular spacer being disposed concentrically between the first pipe and the second pipe and at least partially within the second annular indentation; and
the second axial location is downstream of the first axial location.

13. The exhaust device of claim 1, wherein the at least one spacer includes a first plurality of circumferentially-spaced apart spacers.

14. The exhaust device of claim 13, further comprising a second plurality of circumferentially-spaced apart spacers, wherein the first plurality of circumferentially-spaced apart spacers is disposed at a first axial location, the second plurality of circumferentially-spaced apart spacers is disposed at a second axial location, and the second axial location is downstream of the first axial location.

15. The exhaust device of claim 14, wherein:
the first plurality of circumferentially-spaced apart spacers includes a first spacer and a second spacer, the first spacer being disposed at a first angular location about the longitudinal axis and the second spacer being disposed at a second angular location about the longitudinal axis;
the second plurality of circumferentially-spaced apart spacers includes a third spacer and a fourth spacer, the third spacer being disposed at a third angular location about the longitudinal axis and the fourth spacer being disposed at a fourth angular location about the longitudinal axis;
the third angular location being different than the first angular location and the second angular location; and
the fourth angular location being different than the first angular location and the second angular location.

16. The exhaust device of claim 1, wherein the first pipe is fluidly connected to the exhaust gas inlet and the second pipe is fluidly connected to the exhaust gas outlet.

* * * * *